(12) United States Patent
Ritter et al.

(10) Patent No.: US 10,643,125 B2
(45) Date of Patent: May 5, 2020

(54) METHODS AND SYSTEMS OF NEURON LEAKY INTEGRATE AND FIRE CIRCUITS

(71) Applicant: INTERNATIONAL BUSINESS MACHINES CORPORATION, Armonk, NY (US)

(72) Inventors: Mark B. Ritter, Sherman, CT (US); Takeo Yasuda, Nara (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 898 days.

(21) Appl. No.: 15/059,738

(22) Filed: Mar. 3, 2016

(65) Prior Publication Data

US 2017/0255860 A1    Sep. 7, 2017

(51) Int. Cl.
  *G06N 3/063*   (2006.01)
  *G06N 3/04*   (2006.01)

(52) U.S. Cl.
  CPC .......... *G06N 3/0635* (2013.01); *G06N 3/049* (2013.01)

(58) Field of Classification Search
  CPC ....... G06N 3/063; G06N 3/0635; G05F 6/262
  See application file for complete search history.

(56) References Cited

U.S. PATENT DOCUMENTS

| | | | | |
|---|---|---|---|---|
| 5,696,883 A | * | 12/1997 | Arima | ........................ G06J 1/00 706/38 |
| 5,780,904 A | * | 7/1998 | Konishi | ................... G05F 3/262 257/348 |
| 6,956,280 B2 | * | 10/2005 | Tajiri | ...................... G06N 3/063 257/537 |
| 8,977,583 B2 | | 3/2015 | Modha | |
| 8,996,430 B2 | | 3/2015 | Modha | |
| 9,152,916 B2 | | 10/2015 | Esser et al. | |
| 10,078,800 B2 | * | 9/2018 | Suri | ....................... G06N 3/063 |
| 2005/0102247 A1 | | 5/2005 | Wells et al. | |
| 2010/0081958 A1 | | 4/2010 | She | |
| 2015/0112911 A1 | | 4/2015 | Jackson et al. | |
| 2015/0206050 A1 | | 7/2015 | Talathi et al. | |
| 2015/0262054 A1 | | 9/2015 | Carey et al. | |

(Continued)

FOREIGN PATENT DOCUMENTS

WO    2015148217 A1    10/2015

*Primary Examiner* — Lincoln D Donovan
*Assistant Examiner* — Colleen J O Toole
(74) *Attorney, Agent, or Firm* — Cantor Colburn LLP; Vazken Alexanian (57) ABSTRACT

Embodiments include methods and systems of neuron leaky integrate and fire circuit (NLIFC). Aspects include: receiving an input current having both AC component and DC component at an input terminal of the NLIFC, extracting AC component of input current, generating a number of swing voltages at a swing node using extracted AC component of the input current, transferring charge from a pull-up node to a neuron membrane potential (NP) node through an integration diode and a pull-up diode to raise a voltage at NP node over an integration capacitor gradually and the voltage at NP node shows integration value of AC component of input current, implementing leaky decay function of the neuron leaky integrate and fire circuit, detecting a timing of neuron fire using an analog comparator, resetting a neuron membrane potential level for a refractory period after neuron fire, and generating fire output signal of the NLIFC.

8 Claims, 5 Drawing Sheets

(56) References Cited

U.S. PATENT DOCUMENTS

| | | |
|---|---|---|
| 2015/0262059 A1 | 9/2015 | Esser et al. |
| 2015/0276867 A1 | 10/2015 | Alvarez-Icaza Rivera et al. |
| 2015/0278682 A1 | 10/2015 | Saxena |
| 2015/0310303 A1 | 10/2015 | Andreopoulos et al. |
| 2016/0065199 A1* | 3/2016 | Hagiwara ............ H03K 5/2481 327/56 |
| 2017/0230019 A1 | 8/2017 | Chandrakumar et al. |

* cited by examiner

METHODS AND SYSTEMS OF NEURON LEAKY INTEGRATE AND FIRE CIRCUITS

BACKGROUND

The present invention relates generally to chip manufacturing, and more particularly to methods and systems of neuron leaky integrate and fire circuits.

In software simulation of neuromorphic computing system, mathematical model is often used. In a most basic mathematical neuron model, multiple input data are multiplied with synapse weight values in "synapse weight multiply" block, respectively. Then the multiplied results are summed up and accumulated in "sum" block to have a neuron membrane potential. The neuron membrane potential is compared with a certain threshold value in a "threshold compare" block to have pulse signal which is described "fire output" of the system. As the behavior of the neuron is inherently asynchronous, the input of the neuron may include a series of pulses which are given to input data asynchronously and irregularly. However there is no memory or integration function in this basic mathematical neuron model. This basic mathematical neuron model only makes approximation of this behavior with a synchronous operation. Thus the result includes approximation error of input timing. To avoid this error, asynchronous operation should be supported. In order to support asynchronous operation, spike-based pulse input data should be introduced and integration function should be prepared at the "sum" block. Also leaky function should be prepared to implement decaying characteristic of neuron membrane potential.

Therefore, heretofore unaddressed needs still exist in the art to address the aforementioned deficiencies and inadequacies.

SUMMARY

In one aspect, the present invention relates to a neuron leaky integrate and fire circuit. In certain embodiments, the neuron leaky integrate and fire circuit may include: an integration circuit, a pull-up circuit, a leak control circuit, an analog comparator, a reset circuit, and a rise edge detector. The integration circuit may include an input capacitor, an integration diode, and an integration capacitor electrically coupled in serial. A first terminal of the input capacitor is electrically coupled to an input voltage at an input terminal of the neuron leaky integrate and fire circuit. A second terminal of the input capacitor is electrically coupled to the anode of the integration diode to form a swing node. The cathode of the integration diode is electrically coupled to a first terminal of the integration capacitor to form a neuron membrane potential node, and a second terminal of the integration capacitor is electrically coupled to a ground.

In certain embodiments, a leak current of a leak control FET of a leak control circuit implements leaky decay function of the neuron leaky integrate and fire circuit.

In certain embodiments, the input capacitor is configured to cut off DC component of an input current from the input terminal and extract AC component of the input current such that a leaky decay function by a leaky current through the leak control FET is implemented on the neuron membrane potential node without the effect of large DC component and fluctuation of the input current at the input terminal of the neuron leaky integrate and fire circuit.

In certain embodiments, the integration circuit is configured to receive the extracted AC component of the input current and generate a number of voltage swings at the swing node. The voltage swings at the swing node transfer charge from a pull-up node to the neuron membrane potential node through the serially connected integration diode and the pull-up diode, and raise the voltage at the neuron membrane potential node over the integration capacitor gradually. The voltage at the neuron membrane potential node shows the integration value of AC component of the input current.

In certain embodiments, the pull-up diode may include one or more diodes electrically coupled in serial, and the integration diode may include one or more diodes electrically coupled in serial. In other embodiments, the pull-up diode may include one or more diode-connected FETs electrically coupled in serial, and the integration diode may include one or more diode-connected FETs electrically coupled in serial. The gate of each of the FETs is electrically coupled to the drain to form an anode of a diode, and the source of each of the FETs forms a cathode of the diode.

In certain embodiments, the integration circuit may include an adjustable integration current suppression resistor. A first terminal of the adjustable integration current suppression resistor is electrically coupled to the cathode terminal of the integration diode, and a second terminal of the adjustable integration current suppression resistor is electrically coupled to the neuron membrane potential node.

In another aspect, the present invention relates to a neuron leaky integrate and fire circuit having an input additional gain stage. In certain embodiments, the input additional gain stage may include an operational amplifier, a first resistor, and a second resistor. The input terminal of the neuron leaky integrate and fire circuit is electrically coupled to a positive input of the operational amplifier. A first terminal of the first resistor is electrically coupled to a bias input terminal. A second terminal of the first resistor is electrically coupled to a negative input of the operational amplifier and a first terminal of the second resistor. A second terminal of the second resistor is electrically coupled to an output terminal of the operational amplifier and the input capacitor.

In yet another aspect, the present invention relates to a method of enhancing performance of a neuron leaky integrate and fire circuit. In certain embodiments, the method may include: receiving an input current having both AC component and DC component at an input terminal of the neuron leaky integrate and fire circuit, extracting the AC component of the input current by using the input capacitor, generating a number of swing voltages at a swing node using the extracted AC component of the input current, transferring charge from a pull-up node to a neuron membrane potential node through an integration diode and a pull-up diode to raise a voltage at the neuron membrane potential node over an integration capacitor gradually and the voltage at the neuron membrane potential node shows the integration value of AC component of the input current, implementing leaky decay function of the neuron leaky integrate and fire circuit using a leak current of a leak control FET of a leak control circuit, detecting a timing of neuron fire using an analog comparator, resetting a neuron membrane potential level for a refractory period after a neuron fire, and generating fire output signal of the neuron leaky integrate and fire circuit.

These and other aspects of the present invention will become apparent from the following description of the preferred embodiment taken in conjunction with the following drawings and their captions, although variations and modifications therein may be affected without departing from the spirit and scope of the novel concepts of the present invention.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION

The present invention is more particularly described in the following examples that are intended as illustrative only since numerous modifications and variations therein will be apparent to those skilled in the art. Various embodiments of the invention are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present invention. Additionally, some terms used in this specification are more specifically defined below.

The terms used in this specification generally have their ordinary meanings in the art, within the context of the present invention, and in the specific context where each term is used. Certain terms that are used to describe the present invention are discussed below, or elsewhere in the specification, to provide additional guidance to the practitioner regarding the description of the present invention. It will be appreciated that same thing can be said in more than one way. Consequently, alternative language and synonyms may be used for any one or more of the terms discussed herein, nor is any special significance to be placed upon whether or not a term is elaborated or discussed herein. The use of examples anywhere in this specification including examples of any terms discussed herein is illustrative only, and in no way limits the scope and meaning of the present invention or of any exemplified term. Likewise, the present invention is not limited to various embodiments given in this specification.

Unless otherwise defined, all technical and scientific terms used herein have the same meaning as commonly understood by one of ordinary skill in the art to which this invention pertains. In the case of conflict, the present document, including definitions will control.

As used herein, "plurality" means two or more. The terms "comprising," "including," "carrying," "having," "containing," "involving," and the like are to be understood to be open-ended, i.e., to mean including but not limited to.

The term "FET" stands for field-effect transistor. The FET may include n-channel FET, p-channel FET, metal-oxide-semiconductor field-effect transistor (MOSFET), dual-gate MOSFET (DGMOSFET), insulated-gate bipolar transistor (IGBT) etc.

The present invention will now be described more fully hereinafter with reference to the accompanying drawings FIGS. 1-5, in which certain exemplary embodiments of the present invention are shown. The present invention may, however, be embodied in many different forms and should not be construed as limited to the embodiments set forth herein; rather, these embodiments are provided so that this invention will be thorough and complete, and will fully convey the scope of the invention to those skilled in the art.

Figure 1:
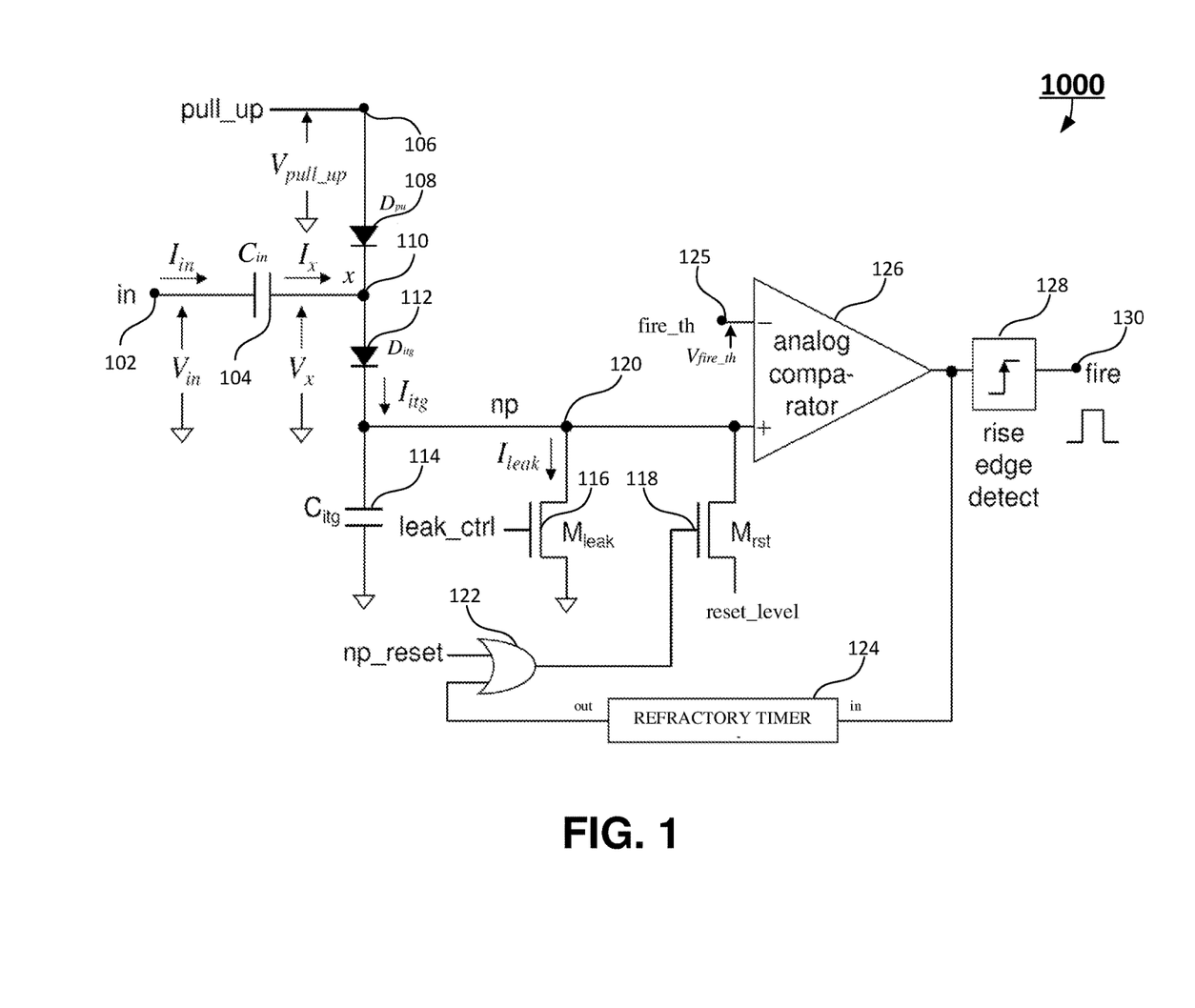
FIG. 1 is a circuit diagram of a neuron leaky integrate and fire circuit according to one embodiment of the present invention.

In one aspect, the present invention relates to a neuron leaky integrate and fire circuit 1000 as shown in FIG. 1. In certain embodiments, the neuron leaky integrate and fire circuit 1000 may include: an integration circuit, a pull-up circuit, a leak control circuit, an analog comparator 126, a reset circuit, and a rise edge detector 128. The integration circuit may include an input capacitor ($C_{in}$) 104, an integration diode ($D_{itg}$) 112, and an integration capacitor ($C_{itg}$) 114 electrically coupled in serial. A first terminal of the "$C_{in}$" 104 is electrically coupled to an input terminal "in" 102 of the neuron leaky integrate and fire circuit 1000. A second terminal of the "$C_{in}$" 104 is electrically coupled to the anode of the "$D_{itg}$" 112 to form a swing node 110. The cathode of the "$D_{itg}$" 112 is electrically coupled to a first terminal of the "$C_{itg}$" 114 to form a neuron membrane potential node "np" 120, and a second terminal of the "$C_{itg}$" 114 is electrically coupled to a ground.

In certain embodiments, the pull-up circuit may include a pull-up diode ($D_{pu}$) 108. The anode of the "$D_{pu}$" 108 is electrically coupled to a pull-up node 106, and the cathode of the "$D_{pu}$" 108 is electrically coupled to the swing node 110.

In certain embodiments, the leak control circuit may include a leak control FET 116. The gate of the leak control FET 116 is electrically coupled to a leak control input terminal "leak_ctrl", the drain of the leak control FET 116 is electrically coupled to the neuron membrane potential node "np" 120, and the source of the leak control FET 116 is electrically coupled to the ground. A leak current of the leak control FET 116 of the leak control circuit implements leaky decay function of the neuron leaky integrate and fire circuit 1000.

In certain embodiments, a positive input terminal of the analog comparator 126 is electrically coupled to the neuron membrane potential node "np" 120, and a negative input terminal of the analog comparator 126 is electrically coupled to an input terminal "fire_th" 125 which supplies a threshold level of neuron fire ($V_{fire\_th}$). The analog comparator 126 is configured to compare the voltage at the "np" node 120 with the "$V_{fire\_th}$", wherein when the voltage at the "np" node 120 is equal to the "$V_{fire\_th}$", the voltage at the "np" node 120 is reset to a voltage level of "reset_level" input terminal and it is kept resetting during a refractory period timed by a refractory timer. In one embodiment, the voltage level of the "reset_level" input terminal is the ground level.

In certain embodiments, the reset circuit may include a reset FET 118. The gate of the reset FET 118 is electrically coupled to a reset control circuit, the drain of the reset FET 118 is electrically coupled to the "np" node 120, and the source of the reset FET 118 is electrically coupled to the "reset_level" input terminal. In one embodiment, the voltage level of the "reset_level" input terminal is the ground level.

In certain embodiments, an input of the rise edge detector 128 is electrically coupled to an output terminal of the analog comparator 126, and an output of the rise edge detector 128 electrically coupled to a "fire" output terminal 130 of the neuron leaky integrate and fire circuit 1000. The rise edge detector 128 is configured to generate the pulse at the "fire" output terminal 130 of the neuron leaky integrate and fire circuit 1000 when the rise edge detector 128 detects a rise edge of a signal at the output of the analog comparator 126.

In certain embodiments, the reset control circuit may include an OR gate 122 and a refractory timer 124. The refractory timer 124 implements insensible period of a neuron just after it fires. The refractory timer 124 extends the resetting period until the neuron recovers from insensible state. A first input of the OR gate 122 is electrically coupled to an external reset input terminal for the "np" node 120 (np_reset), and a second input of the OR gate 122 is electrically coupled to an output terminal of the refractory timer 124. The output terminal of the refractory timer 124 is electrically coupled to the second input of the OR gate 122, and an input terminal of the refractory timer 124 is electrically coupled to the output of the analog comparator 126 and the input of the rise edge detector 128.

In certain embodiments, the "$C_{in}$" 104 is configured to cut off DC component of an input current from the "in" input terminal 102 and extract AC component of the input current such that a leaky decay function by a leaky current through the leak control FET 116 is implemented on the "np" node 120 without the effect of large DC component and fluctuation of the input current "$I_{in}$" at the input terminal "in" 102 of the neuron leaky integrate and fire circuit 1000.

The AC components of the input current and the input voltage generate AC voltage swing at the swing node "x" 110 in FIG. 1 and pump up the "$C_{itg}$" 114. Thus the AC component of the input current is converted to AC component of the swing voltages ($V_x$) which is used to charge up the "np" node 120. The voltage at the "np" node 120 shows the integration value of the AC components of the input current "$I_{in}$".

In certain embodiments, the integration circuit is configured to receive the extracted AC component of the input current and generate a number of voltage swings at the swing node "x" 110. The voltage swings at the swing node "x" 110 transfer charge from the "pull-up" node 106 to the "np" node 120 through the serially connected "$D_{pu}$" 108 and the "$D_{itg}$" 112, and raise the voltage at the "np" node 120 over the "$C_{itg}$" 114 gradually. The voltage at the "np" node 120 shows the integration value of AC component of the "$I_{in}$".

In certain embodiments, the drain terminal and the source terminal of the leak control FET (or "$M_{leak}$") are connected to the "np" node 120 and GND node, respectively. The gate terminal of the leak control FET is controlled with the leak control signal which is supplied to a "leak_ctrl" input terminal. Thus the leak current of "$M_{leak}$" which is expressed as "$I_{leak}$" implements leaky decay function of the integration circuit.

Figure 2:
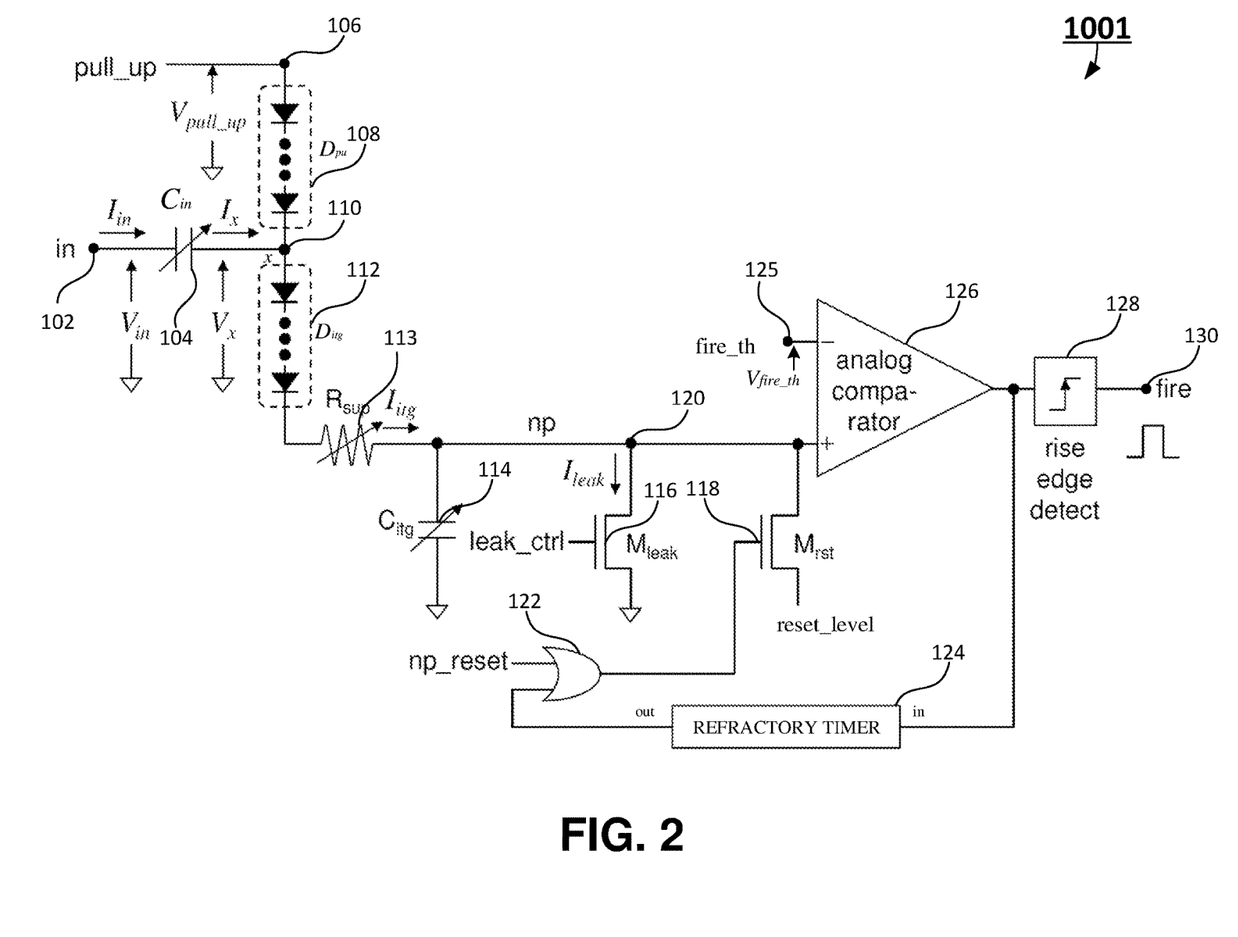
FIG. 2 is a circuit diagram of a neuron leaky integrate and fire circuit according to another embodiment of the present invention.

Referring now to FIG. 2, a neuron leaky integrate and fire circuit 1001 is shown according to another embodiment of the present invention. In one embodiment, the neuron leaky integrate and fire circuit 1001 may include one or more diodes electrically coupled in serial to form the "$D_{pu}$" 108, and one or more diodes electrically coupled in serial to form the "$D_{itg}$" 112. In the neuron leaky integrate and fire circuit 1001, the number of diodes or rectifying device stages in the "$D_{pu}$" 108 and the "$D_{itg}$" 112 is tunable. These devices, for example, can be implemented with p-n junction diode.

In certain embodiments, the integration circuit may include an adjustable integration current suppression resistor "$R_{sup}$" 113. A first terminal of the "$R_{sup}$" 113 is electrically coupled to the cathode terminal of the "$D_{itg}$" 112, and a second terminal of the "$R_{sup}$" 113 is electrically coupled to the "np" node 120. The "$R_{sup}$" 113 is added for integration current suppression tuning. The "$C_{in}$" 104 and the "$C_{itg}$" 114 may also be tunable ones so that the integration circuit can be tuned with several parameters.

Figure 3:
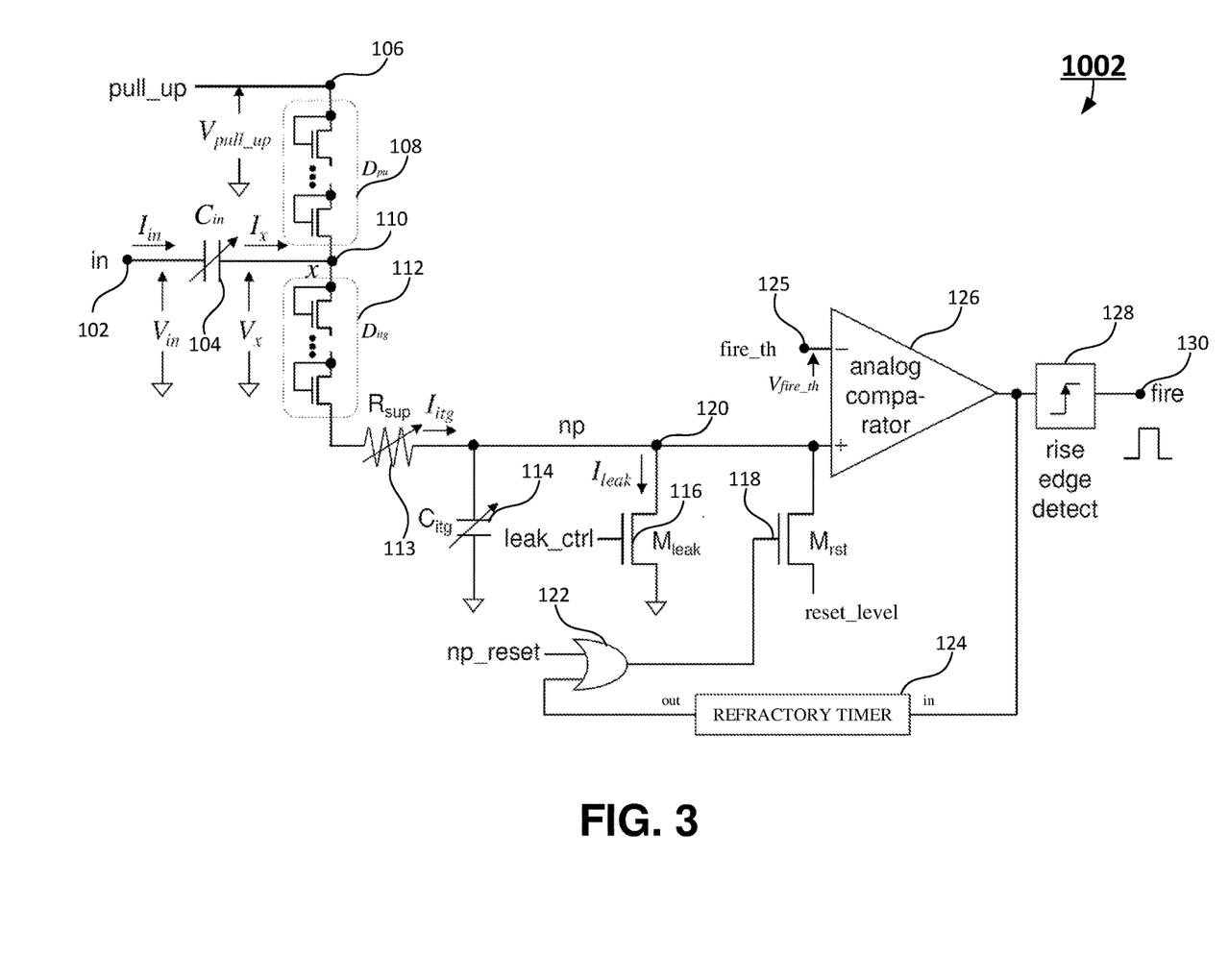
FIG. 3 is a circuit diagram of a neuron leaky integrate and fire circuit according to yet another embodiment of the present invention.

Referring now to FIG. 3, a neuron leaky integrate and fire circuit 1002 is shown according to another embodiment of the present invention. In one embodiment, the "$D_{pu}$" 108 and the "$D_{itg}$" 112 of the neuron leaky integrate and fire circuit 1002 may include diode-connected (gate-drain connected) FETs. The number of diode-connected FETs in the "$D_{pu}$" 108 and the "$D_{itg}$" 112 is tunable. These devices, for example, can also be implemented with p-n junction diodes.

In certain embodiments, the integration circuit of the neuron leaky integrate and fire circuit 1002 may include an "$R_{sup}$" 113. A first terminal of the "$R_{sup}$" 113 is electrically coupled to the cathode terminal of the "$D_{itg}$" 112, and a second terminal of the "$R_{sup}$" 113 is electrically coupled to the "np" node 120. The "$R_{sup}$" 113 is added for integration current suppression tuning. The "$C_{in}$" 104 and the "$C_{itg}$" 114 may also be tunable ones so that the integration circuit can be tuned with several parameters.

Figure 4:
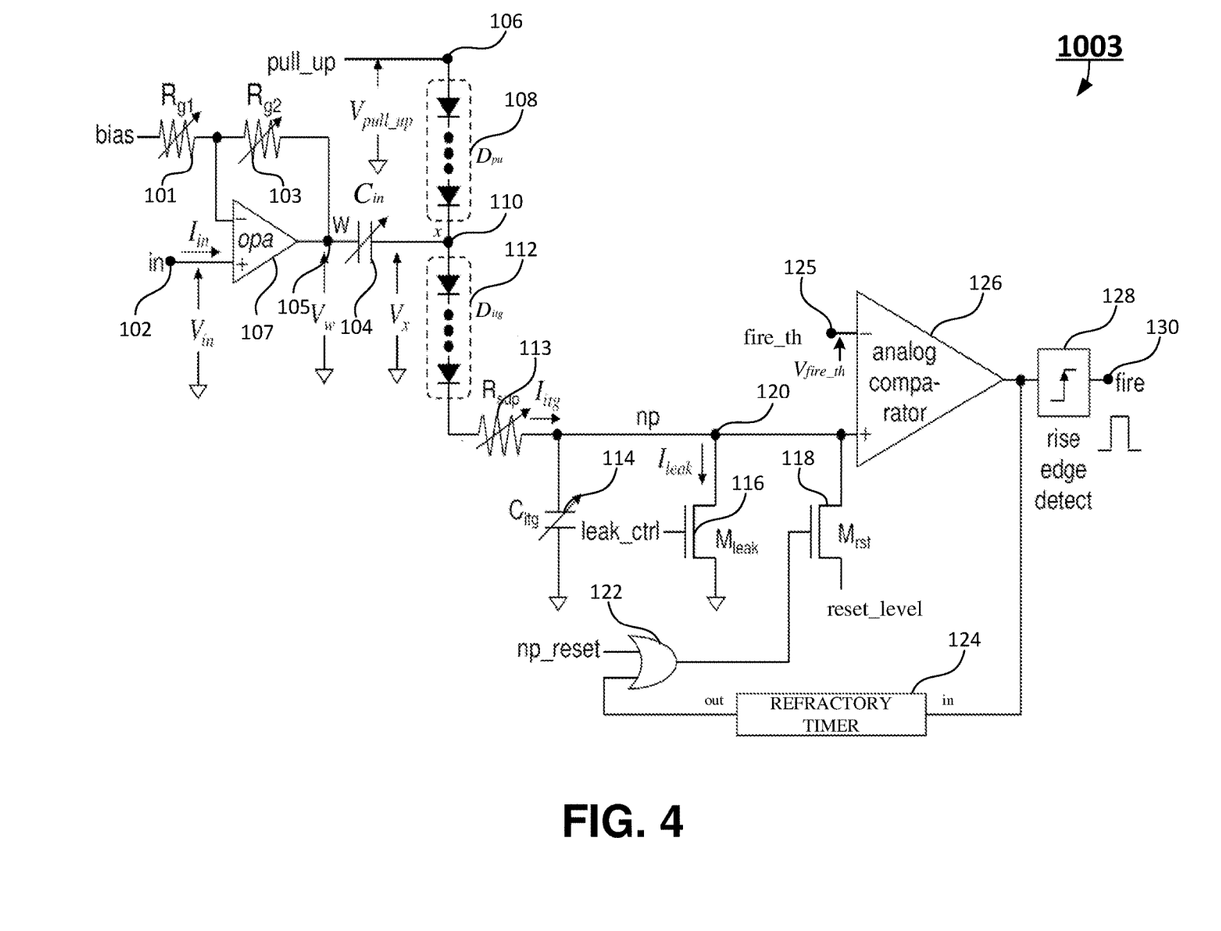
FIG. 4 is a circuit diagram of a neuron leaky integrate and fire circuit according to a further embodiment of the present invention.

Referring now to FIG. 4, a neuron leaky integrate and fire circuit 1003 is shown according to another embodiment of the present invention. In one embodiment, the "$D_{pu}$" 108 and the "$D_{itg}$" 112 of the neuron leaky integrate and fire circuit 1002 may include p-n junction diodes. The number of p-n junction diodes in the "$D_{pu}$" 108 and the "$D_{itg}$" 112 is tunable. These devices, for example, can be implemented with diode-connected FETs.

In certain embodiments, the integration circuit of the neuron leaky integrate and fire circuit 1002 may include an "$R_{sup}$" 113. A first terminal of the "$R_{sup}$" 113 is electrically coupled to the cathode terminal of the "$D_{itg}$" 112, and a second terminal of the "$R_{sup}$" 113 is electrically coupled to the "np" node 120. The "$R_{sup}$" 113 is added for integration current suppression tuning. The "$C_{in}$" 104 and the "$C_{itg}$" 114 may also be tunable ones so that the integration circuit can be tuned with several parameters.

Referring to FIG. 4, in another aspect, the present invention relates to a neuron leaky integrate and fire circuit 1003. In certain embodiments, the neuron leaky integrate and fire circuit 1003 may include: an input additional gain stage and a neuron leaky integrate and fire circuit 1001. The input additional gain stage may include an operational amplifier "opa" 107, a first resistor "$R_{g1}$" 101, and a second resistor "$R_{g2}$" 103. The input terminal "in" 102 of the neuron leaky integrate and fire circuit 1003 is electrically coupled to a positive input of the "opa" 107. A first terminal of the "$R_{g1}$" 101 is electrically coupled to an input terminal "bias". A second terminal of the "$R_{g1}$" 101 is electrically coupled to a negative input of the "opa" 107 and a first terminal of the "$R_{g2}$" 103. A second terminal of the "$R_{g2}$" 103 is electrically coupled to an output terminal 105 of the "opa" 107 and the "$C_{in}$" 104.

The neuron leaky integrate and fire circuit 1003 may include additional gain stage to increase integration gain. In this circuit, the additional gain stage is implemented with the "opa" 107 and tunable resistances including the "$R_{g1}$" 101, and the "$R_{g2}$" 103.

Figure 5:
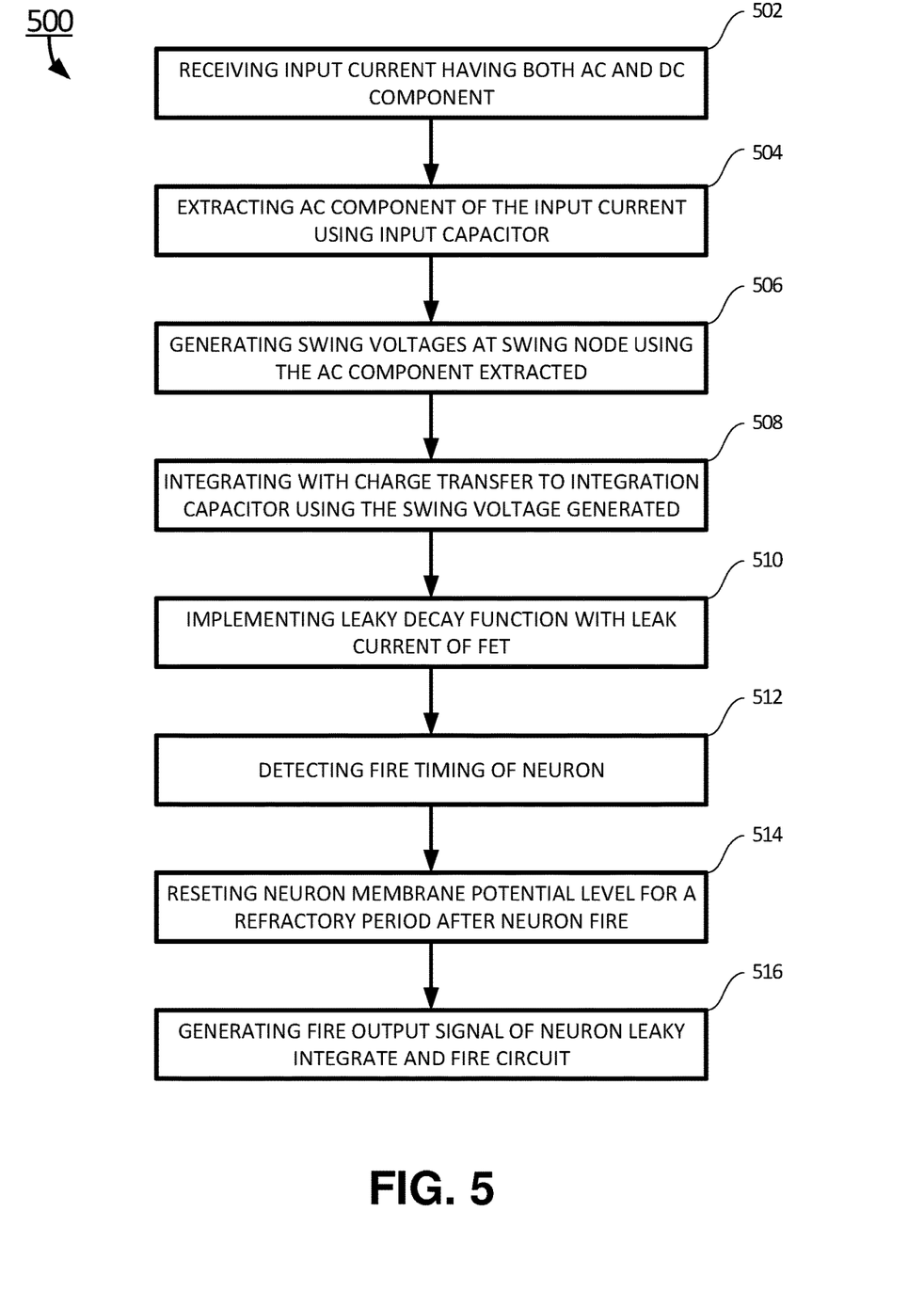
FIG. 5 shows a flow chart of a method of a neuron leaky integrate and fire circuit according to certain embodiments of the present invention.

In yet another aspect, the present invention relates to a method 500 of enhancing performance of a neuron leaky integrate and fire circuit 1000 as shown in FIG. 5.

At block 502, the neuron leaky integrate and fire circuit receives an input current "$I_{in}$" having both AC component and DC component at an input terminal "in" 102 of the leaky integrate and fire circuit. The input current "$I_{in}$" forms an input voltage "$V_{in}$" at the first terminal of the "$C_{in}$" 104.

At block 504, the "$C_{in}$" 104 is used to cut off DC component of the input current "$I_{in}$" from the input terminal 102 and extract AC component of the input current "$I_{in}$".

At block 506, generating a number of swing voltages at a swing node "x" 110 using the extracted AC component of the input current. The AC components of the input current "$I_{in}$" and the input voltage "$V_{in}$" generate AC voltage swing at the swing node "x" 110 and pump up the "$C_{itg}$" 114. Thus the AC component of the input current is converted to AC component of the swing voltages "$V_x$" which is used to charge up the "np" node 120. The voltage at the "np" node 120 shows the integration value of the AC components of the input current.

At block 508, transferring charge from the "pull-up" input terminal 106 to an "np" node 120 through the "$D_{pu}$" 108 and the "$D_{itg}$" 112 to raise a voltage at the "np" node 120 over an "$C_{itg}$" 114 gradually and the voltage at the "np" node 120 shows the integration value of AC component of the input current "$I_{in}$".

At block 510, implementing leaky decay function of the neuron leaky integrate and fire circuit 1000 using a leak current of a leak control FET "$M_{leak}$" 116 of a leak control circuit. In certain embodiments, the drain terminal and the source terminal of the "$M_{leak}$" 116 are connected to the "np" node 120 and GND node, respectively. The gate terminal of the "$M_{leak}$" 116 is controlled with the leak control signal which is supplied to a "leak_ctrl" input terminal. Thus the leak current of the "$M_{leak}$" which is expressed as $I_{leak}$ implements a leaky decay function of the integration circuit on the "np" node 120 without the effect of large DC component and fluctuation of the input current "$I_{in}$" at the input terminal "in" 102 of the neuron leaky integrate and fire circuit 1000.

At block 512, detecting the timing of neuron fire using an analog comparator 126. Then analog comparator compares the voltage of "np" node 120 with the "$V_{fire\_th}$" which is the voltage level of the "fire_th" input terminal 125. The output is digital signal which switches to "High Level" when the voltage of the "np" node 120 is equal to or higher than the "$V_{fire\_th}$", otherwise it switches to "Low Level".

At block 514, resetting the neuron membrane potential level for a refractory period after a neuron fires. The reset circuit may include the refractory timer 124, the OR gate 122, and a reset FET "Mrst"118. Once the output of the analog comparator switches to "High Level", the reset circuit resets the level of the "np" node 120 to the voltage of the "reset_level" terminal with the "Mrst"118. An external reset terminal "np_reset" is used for special cases such as internal state initialization of the neuron leaky integrate and fire circuit.

At block 516, generating fire output signal of neuron leaky integrate and fire circuit. The rise edge detect circuit 128 generates pulses with a certain constant width as neuron fire signal when the analog comparator 126 switches its output to the "High Level". The constant width pulse at output terminal "fire" 130 of neuron leaky integrate and fire circuit ensures correct transfer of the fire signal to another neurons.

Aspects of the present invention are described herein with reference to flowchart illustrations and/or block diagrams of methods, and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A neuron leaky integrate and fire circuit comprising:
 an input additional gain stage;
 an integration circuit having an input capacitor, an integration diode, and an integration capacitor electrically coupled in serial, wherein a first terminal of the input capacitor is electrically coupled to an output node of the additional gain stage voltage, a second terminal of the input capacitor is electrically coupled to an anode of the integration diode to form a swing node, a cathode of the integration diode is electrically coupled to a first terminal of the integration capacitor to form a neuron membrane potential node, and a second terminal of the integration capacitor is electrically coupled to a ground;
 a pull-up circuit having a pull-up diode, wherein an anode of the pull-up diode is electrically coupled to a pull-up input terminal, and a cathode of the pull-up diode is electrically coupled to the swing node;
 a leak control circuit having a leak control FET, wherein a gate of the leak control FET is electrically coupled to a leak control input terminal, a drain of the leak control FET is electrically coupled to the neuron membrane potential node, and a source of the leak control FET is electrically coupled to ground;

an analog comparator having a positive input terminal electrically coupled to the neuron membrane potential node, and a negative input terminal electrically coupled to an input terminal which supplies threshold level of neuron fire;

a reset circuit having a reset FET, wherein a gate of the reset FET is electrically coupled to a reset control circuit, a drain of the reset FET is electrically coupled to the neuron membrane potential node, and a source of the reset FET is electrically fixed to reset level or ground level; and a rise edge detector having an input electrically coupled to an output terminal of the analog comparator, and an output terminal electrically coupled to a neuron fire output terminal of the neuron leaky integrate and fire circuit, wherein the rise edge detector is configured to generate fire pulse by sending out the pulse at the fire output terminal of the neuron leaky integrate and fire circuit when the rise edge detector detects a rise edge of a signal at the output of the analog comparator, wherein the input additional gain stage comprises an operational amplifier, a first resistor, and a second resistor, wherein the input terminal of the neuron leaky integrate and fire circuit is electrically coupled to a positive input of the input operational amplifier, a first terminal of the first resistor is electrically coupled to a bias input terminal, a second terminal of the first resistor is electrically coupled to a negative input of the operational amplifier and a first terminal of the second resistor, and a second terminal of the second resistor is electrically coupled to an output of the operational amplifier and the input side node of the input capacitor.

2. A method of removing input AC current from a neuron leaky integrate and fire circuit comprising:

receiving an input current having both AC component and DC component at an input terminal of the neuron leaky integrate and fire circuit;

extracting the AC component of the input current by using an input capacitor;

generating a plurality of swing voltages at a swing node using the extracted AC component of the input current;

transferring charge from a pull-up node to a neuron membrane potential node through an integration diode and a pull-up diode to raise a voltage at the neuron membrane potential node over an integration capacitor gradually, wherein the voltage at the neuron membrane potential node shows the integration value of AC component of the input current;

implementing leaky decay function of the neuron leaky integrate and fire circuit using a leak current of a leak control FET of a leak control circuit;

detecting a timing of neuron fire using an analog comparator;

resetting a neuron membrane potential level for a refractory period after a neuron fire; and generating fire output signal of the neuron leaky integrate and fire circuit;

wherein the neuron leaky integrate and fire circuit further comprises an input additional gain stage having an operational amplifier, a first resistor, and a second resistor, wherein the input terminal of the neuron leaky integrate and fire circuit is electrically coupled to a positive input of the operational amplifier, a first terminal of the first resistor is electrically coupled to a bias input terminal, a second terminal of the first resistor is electrically coupled to a negative input of the operational amplifier and a first terminal of the second resistor, and a second terminal of the second resistor is electrically coupled to an output terminal of the operational amplifier and the input capacitor.

3. The method of claim 2, wherein the neuron leaky integrate and fire circuit comprises:

the integration circuit having the input capacitor, the integration diode, and the integration capacitor electrically coupled in serial, wherein a first terminal of the input capacitor is electrically coupled to an input voltage, a second terminal of the input capacitor is electrically coupled to an anode of the integration diode to form the swing node, a cathode of the integration diode is electrically coupled to a first terminal of the integration capacitor to form the neuron membrane potential node, and a second terminal of the integration capacitor is electrically coupled to a ground;

a pull-up circuit having the pull-up diode, wherein an anode of the pull-up diode is electrically coupled to the pull-up input terminal, and a cathode of the pull-up diode is electrically coupled to the swing node;

the leak control circuit having a leak control FET, wherein a gate of the leak control FET is electrically coupled to a leak control input terminal, a drain of the leak control FET is electrically coupled to the neuron membrane potential node, and a source of the leak control FET is electrically coupled to ground;

an analog comparator having a positive input terminal electrically coupled to the neuron membrane potential node, and a negative input terminal electrically coupled to an input terminal which supplies a threshold level of neuron fire;

a reset circuit having a reset FET, wherein a gate of the reset FET is electrically coupled to a reset control circuit, a drain of the reset FET is electrically coupled to the neuron membrane potential node, and a source of the reset FET is electrically fixed to the reset level or ground level; and a rise edge detector having an input electrically coupled to an output terminal of the analog comparator, and an output terminal electrically coupled to a fire output terminal of the neuron leaky integrate and fire circuit, wherein the rise edge detector is configured to generate fire pulse by sending out the pulse at the fire output terminal of the neuron leaky integrate and fire circuit when the rise edge detector detects a rise edge of a signal at the output of the analog comparator.

4. The method of claim 2, wherein the input capacitor is configured to cut off DC component of an input current and extract AC component of the input current, wherein a leaky decay function by a leaky current through the leak control FET is implemented on the neuron membrane potential node without the effect of large DC component and fluctuation of the input current at the input terminal of the neuron leaky integrate and fire circuit.

5. The method of claim 2, wherein the analog comparator is configured to compare the voltage at the neuron membrane potential node with the threshold level of neuron fire, wherein when the voltage at the neuron membrane potential node is equal to the threshold level of neuron fire, the voltage at the neuron membrane potential node is reset to a voltage level of a "reset_level" input terminal and it is kept resetting during a refractory period timed by the refractory timer.

6. The method of claim 2, wherein the pull-up diode comprises one or more diodes electrically coupled in serial, and the integration diode comprises one or more diodes electrically coupled in serial.

7. The method of claim 2, wherein the pull-up diode comprises one or more diode-connected FETs electrically coupled in serial, and the Integration diode comprises one or more diode-connected FETs electrically coupled in serial, wherein the gate of each of the FETs is electrically coupled to the drain to form an anode of a diode, and the source of each of the FETs forms a cathode of the diode.

8. The method of claim 2, wherein the integration circuit further comprises an adjustable integration current suppression resistor, wherein a first terminal of the adjustable integration current suppression resistor is electrically coupled to the cathode terminal of the integration diode, and a second terminal of the adjustable integration current suppression resistor is electrically coupled to the neuron membrane potential node.

* * * * *